US00RE49600E

(19) United States
(12) Reissued Patent
Stempo et al.

(10) Patent Number: US RE49,600 E
(45) Date of Reissued Patent: Aug. 8, 2023

(54) FLEXIBLE ASSEMBLY FOR SPRINKLERS

(71) Applicant: Victaulic Company, Easton, PA (US)

(72) Inventors: John M. Stempo, Bethlehem, PA (US); Rudolf Szentimrey, Nazareth, PA (US); Lawrence W. Thau, Jr., Flemington, NJ (US)

(73) Assignee: Victaulic Company, Easton, PA (US)

(21) Appl. No.: 17/102,489

(22) Filed: Nov. 24, 2020

Related U.S. Patent Documents

Reissue of:
(64) Patent No.: 10,478,650
Issued: Nov. 19, 2019
Appl. No.: 15/176,590
Filed: Jun. 8, 2016

U.S. Applications:
(60) Continuation of application No. 13/873,505, filed on Apr. 30, 2013, now Pat. No. 9,375,594, which is a
(Continued)

(51) Int. Cl.
*A62C 35/68* (2006.01)
*F16L 27/08* (2006.01)
(Continued)

(52) U.S. Cl.
CPC ..... *F16L 27/047* (2013.01); *A62C 35/68* (2013.01); *E04B 9/068* (2013.01); *F16L 3/16* (2013.01);
(Continued)

(58) Field of Classification Search
CPC ... F16L 37/088; F16L 27/0808; F16L 27/047; F16L 3/16; F16L 27/08; A62C 35/68; E04B 9/068
See application file for complete search history.

(56) References Cited

U.S. PATENT DOCUMENTS 1,349,586 A 8/1920 Siegel
2,366,067 A 12/1944 Smith
(Continued)

FOREIGN PATENT DOCUMENTS

CN 86104733 1/1987
CN 86104733 A 1/1987
(Continued)

OTHER PUBLICATIONS

Author Unknown; VicFlex Style VS1 Dry Sprinkler, Models V3505, V3506, V3509, V3510, V3517, V3518; 2019 Victaulic Company; 10.91; 9374 Rev K Updated Dec. 2019; 16 Pages.
(Continued)

*Primary Examiner* — Joseph A Kaufman
(74) *Attorney, Agent, or Firm* — Ballard Spahr LLP

(57) ABSTRACT

An assembly for connecting a sprinkler to a branch line of a fire suppression system includes a flexible conduit having one end attached to the branch line. The opposite end is attached to the sprinkler. An adapter may be positioned between the conduit and the sprinkler, between the conduit and the branch line, or between the conduit and both the branch line and the sprinkler. The adapter contains a rotating joint which prevents torque from being applied to the conduit. The adapter between the conduit and the sprinkler is received within a bracket. The bracket also receives a cross beam for securing the sprinkler relatively to the branch line.

27 Claims, 7 Drawing Sheets

Related U.S. Application Data continuation of application No. 13/709,313, filed on Dec. 10, 2012, now abandoned, which is a division of application No. 12/877,357, filed on Sep. 8, 2010, now Pat. No. 8,336,920.

(60) Provisional application No. 61/241,615, filed on Sep. 11, 2009.

(51) Int. Cl.

| | |
|---|---|
| ***F16L 27/047*** | (2006.01) |
| ***E04B 9/06*** | (2006.01) |
| ***F16L 3/16*** | (2006.01) |
| ***F16L 37/088*** | (2006.01) |

(52) U.S. Cl.

CPC ..... *F16L 27/08* (2013.01); *F16L 27/0808* (2013.01); *F16L 37/088* (2013.01)

(56) References Cited

U.S. PATENT DOCUMENTS

| | | | | |
|---|---|---|---|---|
| 2,758,612 | A | 8/1956 | Zaleski | |
| 2,785,612 | A | 8/1956 | Zaleski | |
| 3,028,289 | A | 4/1962 | Roberts et al. | |
| 3,186,438 | A | 6/1965 | Holmgren | |
| 3,565,464 | A | 2/1971 | Wolf | |
| 3,672,705 | A | 6/1972 | Rush | |
| 3,785,682 | A | 1/1974 | Schaller et al. | |
| 3,924,661 | A | 12/1975 | Bornhoffer | |
| 4,243,253 | A | 1/1981 | Rogers, Jr. | |
| 4,273,365 | A | 6/1981 | Hagar | |
| 4,273,367 | A | 6/1981 | Keeney et al. | |
| 4,415,389 | A | 11/1983 | Medford et al. | |
| 4,647,074 | A | 3/1987 | Pate et al. | |
| 4,766,662 | A | 8/1988 | Bradshaw et al. | |
| 4,783,100 | A | 11/1988 | Klein | |
| 4,785,887 | A | 11/1988 | Miller | |
| 4,964,470 | A | 10/1990 | Gaulin | |
| 4,998,755 | A | 3/1991 | Reeder | |
| 5,040,729 | A | 8/1991 | Carrozza | |
| 5,178,422 | A | 1/1993 | Sekerchak | |
| 5,201,554 | A | 4/1993 | Gagg et al. | |
| 5,242,112 | A | 9/1993 | Dunn et al. | |
| 5,277,459 | A | 1/1994 | Braun et al. | |
| 5,316,348 | A | 5/1994 | Franklin | |
| 5,327,976 | A | 7/1994 | Hattori | |
| 5,396,959 | A | 3/1995 | MacDonald | |
| 5,553,893 | A | 9/1996 | Foti | |
| 5,816,622 | A | 10/1998 | Carter | |
| 5,842,526 | A | 12/1998 | Archer et al. | |
| 5,857,711 | A | 1/1999 | Comin-Dumong et al. | |
| 6,076,608 | A | 6/2000 | MacDonald, III et al. | |
| 6,119,784 | A | 9/2000 | MacDonald, III et al. | |
| 6,123,154 | A | 9/2000 | MacDonald, III et al. | |
| 6,158,519 | A | 12/2000 | Kretschmer | |
| 6,488,097 | B1 | 12/2002 | MacDonald, III et al. | |
| 6,691,790 | B1 | 2/2004 | MacDonald, III et al. | |
| 6,752,218 | B2 | 6/2004 | MacDonald, III et al. | |
| 6,907,938 | B2 | 6/2005 | MacDonald, III et al. | |
| 7,032,680 | B2 | 4/2006 | MacDonald, III et al. | |
| 7,100,947 | B2 | 9/2006 | Freudinger | |
| 7,296,634 | B2 | 11/2007 | MacDonald, III et al. | |
| 7,373,720 | B1 | 5/2008 | Jensen et al. | |
| 7,735,787 | B2 | 6/2010 | Kafenshtok et al. | |
| 7,784,746 | B2 | 8/2010 | Kafenshtok et al. | |
| 7,802,628 | B1 | 9/2010 | Silva | |
| 8,205,804 | B2 | 6/2012 | Parker | |
| 8,336,920 | B2 * | 12/2012 | Stempo | A62C 35/68 285/114 |
| 9,339,673 | B2 | 5/2016 | Shipman | |
| 9,358,411 | B2 | 6/2016 | Shipman | |
| 9,375,594 | B2 * | 6/2016 | Stempo | A62C 35/68 |
| 9,415,250 | B2 | 8/2016 | Bucher | |
| 2002/0195817 | A1 | 12/2002 | Choi | |
| 2003/0066658 | A1 | 4/2003 | MacDonald, III et al. | |
| 2004/0012201 | A1 * | 1/2004 | Bartholoma | F16L 37/088 285/39 |
| 2004/0026533 | A1 | 2/2004 | MacDonald, III et al. | |
| 2004/0177976 | A1 | 9/2004 | MacDonald, III et al. | |
| 2005/0194153 | A1 | 9/2005 | MacDonald, III et al. | |
| 2005/0284644 | A1 | 12/2005 | MacDonald, III et al. | |
| 2007/0095548 | A1 | 5/2007 | MacDonald, III et al. | |
| 2008/0066932 | A1 | 3/2008 | MacDonald, III et al. | |
| 2008/0099640 | A1 | 5/2008 | Kafenshtok et al. | |
| 2008/0110518 | A1 | 5/2008 | Hamilton | |
| 2008/0230238 | A1 | 9/2008 | Jackson | |
| 2008/0236847 | A1 | 10/2008 | Sanchez et al. | |
| 2008/0257567 | A1 | 10/2008 | MacDonald, III et al. | |
| 2010/0194096 | A1 * | 8/2010 | Seifert | F16L 27/073 29/890.141 |
| 2011/0148098 | A1 * | 6/2011 | Flynn | F16L 37/088 285/317 |
| 2011/0215566 | A1 | 9/2011 | Stempo et al. | |
| 2012/0068454 | A1 * | 3/2012 | Hamaguchi | F16L 37/088 285/374 |
| 2012/0284994 | A1 * | 11/2012 | Crompton | F16L 37/0915 285/308 |
| 2014/0102729 | A1 | 4/2014 | Ringer et al. | |
| 2014/0197632 | A1 * | 7/2014 | Hennemann | F16L 37/091 285/319 |
| 2018/0297050 | A1 | 10/2018 | Garden | |

FOREIGN PATENT DOCUMENTS

| | | | | |
|---|---|---|---|---|
| CN | 101520116 | | 9/2009 | |
| CN | 101520116 | A | 9/2009 | |
| EP | 2147997 | A1 * | 1/2010 | A47L 15/4217 |
| FR | 212057 | | 8/1972 | |
| FR | 2122057 | | 8/1972 | |
| GB | 777749 | | 6/1957 | |
| GB | 2178125 | | 2/1987 | |
| GB | 2178125 | A | 2/1987 | |
| JP | 08-24359 | | 1/1996 | |
| JP | H0824359 | A | 1/1996 | |
| JP | 200527769 | | 2/2005 | |
| WO | WO-0202983 | A1 * | 1/2002 | F16L 25/0045 |

OTHER PUBLICATIONS

Author Unknown, English translation of Korean Office Action from counterpart Korean patent application No. 2012-7002351, pp. 1-16, dated Oct. 27, 2016, translation prepared by Book Chon Patent Attorneys, Seoul, Korea.

Author Unknown; English translation of Korean Office Action from counterpart Korean patent application No. 2016-7036623; pp. 1-13; dated Apr. 12, 2017; Translation prepared by Book Chon Patent Attorneys, Seoul, Korea.

Dauvergne, Bertrand, First Office Action from counterpart European patent application No. 10816002.9, dated Sep. 2, 2013, pp. 1-4, European Patent Office, Munich, Germany.

Dauvergne, Bertrand, European Search Report from counterpart European patent application No. 14168817.6; pp. 1-2, dated Sep. 4, 2014, European Patent Office, Munich, Germany.

Dauvergne, Bertrand, European Search Opinion from counterpart European patent application No. 14168817.6; pp. 1-3, dated Sep. 4, 2014, European Patent Office, Munich, Germany.

Haiyan, Wen; Search Report from couterpart Chinese patent application No. 201310597564.3; pp. 1-2; dated Mar. 24, 2015, Patent Office of the People's Republic of China, Beijing, China.

Copenheaver, Blaine R.; International Search Report from counterpart International patent application No. PCT/US2010/048083; dated Nov. 12, 2010, pp. 1-2 United States Patent and Trademark Office as International Searching Authority, Alexandria, Virginia.

Copenheaver, Blaine R.; Written Opinion from counter-part International patent application No. PCT/US2010/048083; dated Nov.

(56) References Cited

OTHER PUBLICATIONS 12, 2010, pp. 1-5, United States Patent and Trademark Office as International Searching Authority, Alexandria, Virginia.

* cited by examiner

FIG.8
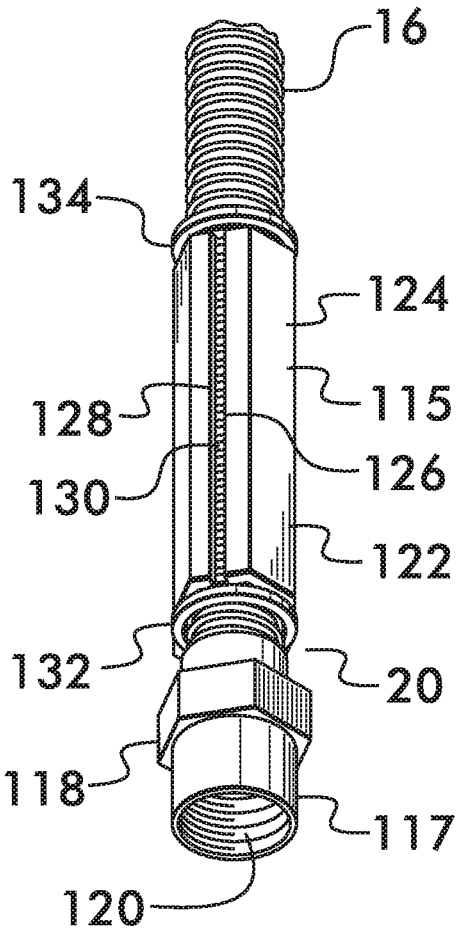
FIG.9
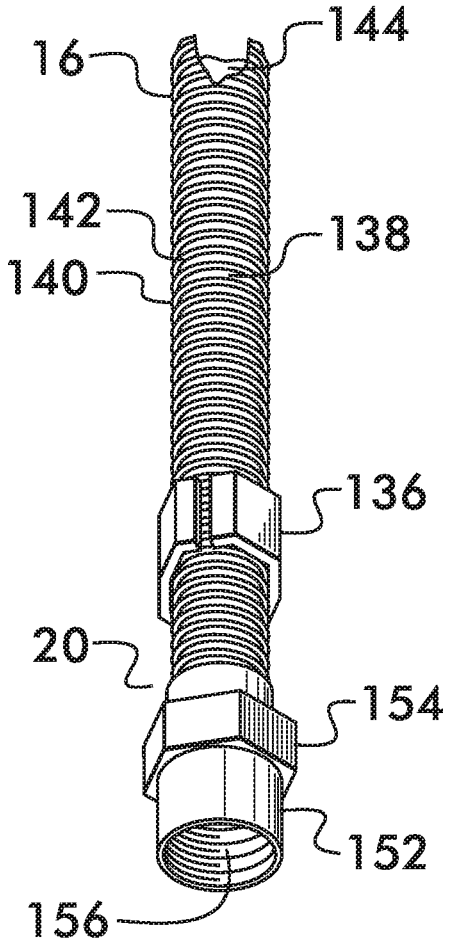
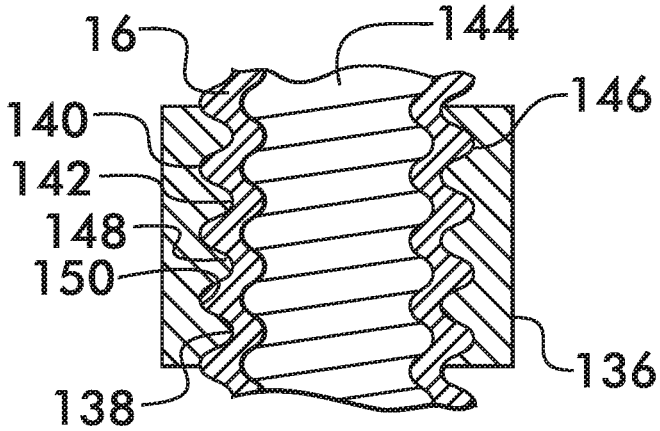
FIG.10

FIG. 11
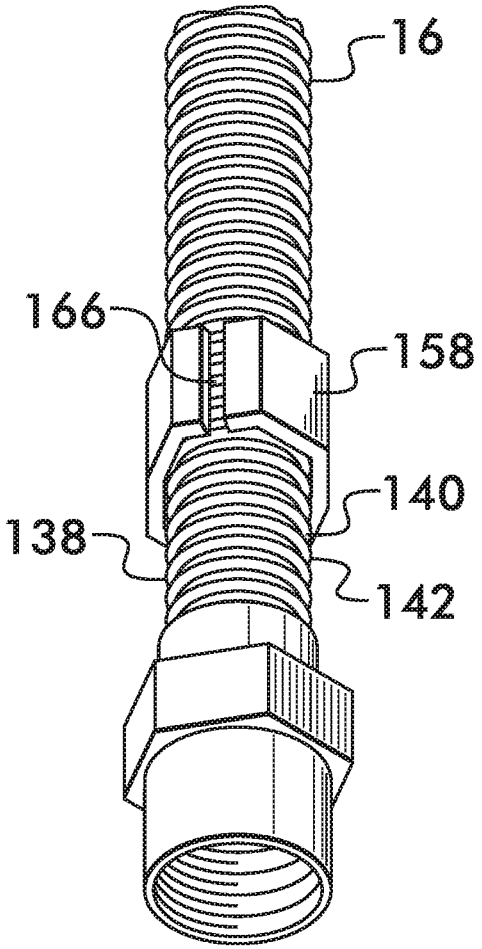
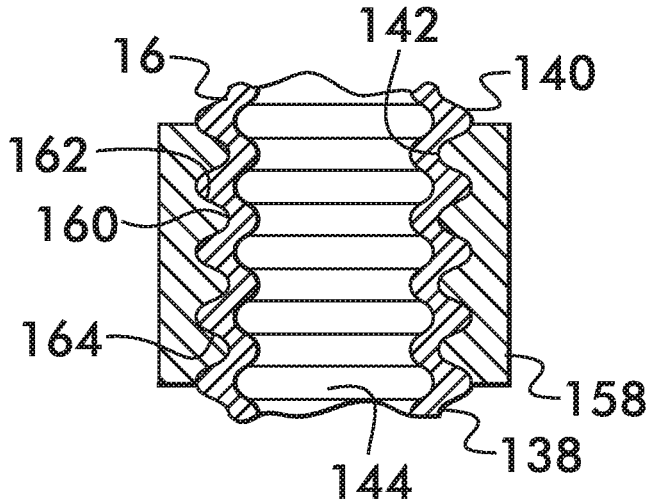
FIG. 12

FLEXIBLE ASSEMBLY FOR SPRINKLERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a continuation of and claims priority to U.S. patent application Ser. No. 13/873,505, filed Apr. 30, 2013, now U.S. Pat. No. 9,375,594, which is a continuation of and claims priority to U.S. patent application Ser. No. 13/709,313, filed Dec. 10, 2012, now abandoned, which is a divisional of U.S. patent application Ser. No. 12/877,357, filed Sep. 8, 2010, now U.S. Pat. No. 8,336,920, which is based upon and claims priority to U.S. Provisional Application No. 61/241,615 filed Sep. 11, 2009, all of which are hereby incorporated by reference herein.

FIELD OF THE INVENTION

This invention relates to a flexible assembly for connecting sprinklers to branch lines in a fire suppression system.

BACKGROUND

Fire suppression sprinkler systems used, for example, in structures such as office buildings, hotels, warehouses and private residences have a piping network comprising a riser pipe connected to a source of pressurized fire suppressing fluid, for example, a liquid, such as water, or a gas, such as halon. Branch pipe lines are connected to the riser pipe at each floor of the structure and extend throughout each floor so that fire suppressing fluid may be delivered through the branch lines to any location on each floor. The branch lines are usually suspended on hangers attached to the structural ceiling of each floor. Sprinklers, which serve to discharge the fluid in the event of a fire, are connected to the branch lines by flexible conduits. The use of flexible conduits provides a great advantage as it allows the position of the sprinklers to be easily adjusted, both laterally and vertically, in relation to the decorative ceiling which may be suspended beneath the structural ceiling of each floor. The flexible conduit saves time during installation, as it obviates the need for the technician to install a rigid pipe assembly, comprised of couplings and pipe segments, to connect the branch line to each sprinkler head on the floor. With a rigid pipe assembly even a minor miscalculation, either in the design or installation, can be aesthetically and functionally unacceptable, and require a redesign and reinstallation.

Although advantageous, flexible conduits used to connect sprinklers to branch lines of fire suppression systems have certain drawbacks. For example, one disadvantage which occurs when flexible conduits are used is the problem of over-torquing the conduit. The sprinklers may have threaded connections and torque is applied to connect them to the end of the flexible conduit. Torque inadvertently applied to the conduit during installation of the sprinkler may cause leaks to occur, for example, at the fitting where the conduit is connected to the branch line. Additionally, torque may be applied to the flexible conduit as a result of a seismic event such as an earthquake due to relative motion between the branch line and the sprinkler. If the applied torque damages the flexible conduit, causing it to leak, that may prevent fire suppressing fluid from reaching other parts of the system where a fire has broken out as a result of the event. It is advantageous to avoid applying torque to the flexible conduit to avoid damage. There is clearly a need for a flexible assembly which avoids the disadvantages associated with known flexible conduit.

SUMMARY

The invention concerns an assembly for connecting a sprinkler to a branch line of a fire suppression system. In one example embodiment the assembly comprises a flexible conduit having a first end connectable to the branch line, and a second end connectable to the sprinkler. The conduit provides fluid communication between the branch line and the sprinkler. A first adapter is positioned between the sprinkler and the second end of the conduit for effecting attachment of the sprinkler to the conduit. The first adapter has a bore providing fluid communication between the sprinkler and the conduit. The first adapter has a first adapter portion attachable to the sprinkler and a second adapter portion attached to the second end of the conduit. The first and second adapter portions are rotatable relatively to one another. A bracket has an opening which receives the first adapter portion. The bracket has a locking unit movably mounted on the bracket. The locking unit engages and retains the first adapter portion within the opening. A cross beam is received by the bracket for securing the bracket in relation to the branch line.

In a specific example embodiment the second adapter portion comprises a tube attached to the second end of the conduit. The tube is received within the bore of the adapter in the first adapter portion. A ring seal is positioned between an outer surface of the tube and an inner surface of the bore in the first adapter portion for effecting a fluid-tight connection between the first and second adapter portions. A split ring is positioned between the outer surface of the tube and the inner surface of the bore in the first adapter portion. The split ring has an inner portion sized to fit within an outwardly facing circumferential groove positioned in the outer surface of the tube. The split ring further has an outer portion sized to fit within an inwardly facing circumferential groove positioned in the inner surface of the bore in the first adapter portion. The split ring prevents relative axial movement between the first and second adapter portions but permits relative rotation between the first and second adapter portions about a longitudinal axis concentric with the bore.

In another example embodiment the first adapter portion comprises a concave spherical surface positioned at an end thereof and surrounding the bore. The second adapter portion comprises a convex spherical surface surrounding the bore and positioned at one end thereof. An opposite end of the second adapter portion is attached to the second end of the conduit. The convex spherical surface fits within the concave spherical surface thereby permitting the first and second adapter portions to rotate relatively to one another. A retainer has a concave spherical surface. The retainer surrounds the convex spherical surface of the second adapter portion and is attached to the first adapter portion. The second adapter portion is captured between the retainer and the first adapter portion.

By way of example a first seal is positioned between the second adapter portion and the retainer, and a second seal is positioned between the retainer and the first adapter portion. Further by way of example the retainer comprises a nut which threadedly engages the first adapter portion.

In a specific example embodiment the assembly comprises the sprinkler.

In another example the assembly further comprises a second adapter positioned between the branch line and the first end of the conduit for effecting attachment of the conduit to the branch line. The second adapter has a second bore providing fluid communication between the branch line and the conduit. The second adapter has a third adapter portion attachable to the branch line and a fourth adapter portion attached to the first end of the conduit. The third and fourth adapter portions are rotatable relatively to one another.

Further by way of example the fourth adapter portion comprises a second tube attached to the first end of the conduit. The second tube is received within the bore of the second adapter in the third adapter portion. A ring seal is positioned between an outer surface of the second tube and an inner surface of the bore in the third adapter portion for effecting a fluid-tight connection between the third and fourth adapter portions. A split ring is positioned between the outer surface of the second tube and the inner surface of the bore in the third adapter portion. The split ring has an inner portion sized to fit within an outwardly facing circumferential groove positioned in the outer surface of the second tube. The split ring further has an outer portion sized to fit within an inwardly facing circumferential groove positioned in the inner surface of the bore in the third adapter portion. The split ring prevents relative axial movement between the third and fourth adapter portions but permitting relative rotation between the third and fourth adapter portions about a longitudinal axis concentric with the second bore.

In another example embodiment the third adapter portion comprises a concave spherical surface positioned at an end thereof and surrounding the bore in the third adapter portion. The fourth adapter portion comprises a convex spherical surface surrounding the bore in the fourth adapter portion and positioned at one end thereof. An opposite end of the fourth adapter portion is attached to the first end of the conduit. The convex spherical surface of the fourth adapter portion fits within the concave spherical surface of the third adapter portion thereby permitting the third and fourth adapter portions to rotate relatively to one another. A second retainer has a concave spherical surface; the second retainer surrounds the convex spherical surface of the fourth adapter portion and is attached to the third adapter portion. The fourth adapter portion is captured between the second retainer and the third adapter portion.

Another example assembly further comprises a third seal positioned between the second retainer and the fourth adapter portion and a fourth seal positioned between the second retainer and the third adapter portion. In another example the second retainer comprises a nut which threadedly engages the third adapter portion.

By way of example the bracket comprises a plurality of sidewalls attached to one another in spaced relation to define a U-shaped opening. In a specific embodiment the locking unit comprises a wire bale pivotably attached to the bracket. In another embodiment the locking unit comprises a finger pivotably attached to the bracket.

Another example embodiment of an assembly for connecting a sprinkler to a branch line of a fire suppression system comprises a flexible conduit having a first end connectable to the branch line, and a second end connectable to the sprinkler. The conduit provides fluid communication between the branch line and the sprinkler. A first adapter has a first adapter portion attachable to the branch line and a second adapter portion attached to the first end of the conduit. The first and second adapter portions are rotatable relatively to one another. The first adapter has a bore providing fluid communication between the branch line and the conduit. A second adapter is positioned between the sprinkler and the second end of the conduit for effecting attachment of the conduit to the sprinkler. The second adapter has a bore providing fluid communication between the sprinkler and the conduit. A bracket has an opening that receives the second adapter and a locking unit movably mounted on the bracket. The locking unit engages and retains the second adapter within the opening. Across beam is received by the bracket for securing the bracket in relation to the branch line.

In one example embodiment the assembly comprises the sprinkler.

In another example embodiment the second adapter portion comprises a tube attached to the first end of the conduit. The tube is received within the bore of the first adapter in the first adapter portion. A ring seal is positioned between an outer surface of the tube and an inner surface of the bore in the first adapter portion for effecting a fluid-tight connection between the first and second adapter portions. A split ring is positioned between the outer surface of the tube and the inner surface of the bore in the first adapter portion. The split ring has an inner portion sized to fit within an outwardly facing circumferential groove positioned in the outer surface of the tube. The split ring further has an outer portion sized to fit within an inwardly facing circumferential groove positioned in the inner surface of the bore in the first adapter portion. The split ring prevents relative axial movement between the first and second adapter portions but permits relative rotation between the first and second adapter portions about a longitudinal axis concentric with the bore of the first adapter.

By way of example, the first adapter portion comprises a concave spherical surface positioned at an end thereof and surrounding the bore of the first adapter in the first adapter portion. The second adapter portion comprises a convex spherical surface surrounding the bore in the first adapter portion and positioned at one end thereof. An opposite end of the second adapter portion is attached to the first end of the conduit. The convex spherical surface fits within the concave spherical surface thereby permitting the first and second adapter portions to rotate relatively to one another. A retainer has a concave spherical surface. The retainer surrounds the convex spherical surface of the second adapter portion and is attached to the first adapter portion. The second adapter portion is captured between the retainer and the first adapter portion.

In another example embodiment a first seal is positioned between the second adapter portion and the retainer, and a second seal is positioned between the retainer and the first adapter portion. In a specific example, the retainer comprises a nut which threadedly engages the first adapter portion.

In a further example the second adapter has a third adapter portion attachable to the sprinkler and a fourth adapter portion attached to the second end of the conduit. The third and fourth adapter portions are rotatable relatively to one another. The third adapter portion is received within the bracket.

In another example the fourth adapter portion comprises a second tube attached to the second end of the conduit. The second tube is received within the bore of the second adapter in the third adapter portion. A ring seal is positioned between an outer surface of the second tube and an inner surface of the bore in the third adapter portion for effecting a fluid-tight connection between the third and fourth adapter portions. A split ring is positioned between the outer surface of the second tube and the inner surface of the bore of the third adapter portion. The split ring has an inner portion sized to fit within an outwardly facing circumferential groove positioned in the outer surface of the second tube. The split ring further has an outer portion sized to fit within an inwardly facing circumferential groove positioned in the inner surface of the bore in the third adapter portion. The split ring prevents relative axial movement between the third and fourth adapter portions but permits relative rotation between the third and fourth adapter portions about a longitudinal axis concentric with the bore of the second adapter.

In an example embodiment the third adapter portion comprises a concave spherical surface positioned at an end thereof and surrounding the bore in the third adapter portion. The fourth adapter portion comprises a convex spherical surface surrounding the bore in the fourth adapter portion and positioned at one end thereof. An opposite end of the fourth adapter portion is attached to the second end of the conduit. The convex spherical surface of the fourth adapter portion fits within the concave spherical surface of the third adapter portion thereby permitting the third and fourth adapter portions to rotate relatively to one another. A second retainer has a concave spherical surface. The second retainer surrounds the convex spherical surface of the fourth adapter portion and is attached to the third adapter portion. The fourth adapter portion is captured between the second retainer and the third adapter portion.

A specific example embodiment further comprises a third seal positioned between the second retainer and the fourth adapter portion and a fourth seal positioned between the second retainer and the third adapter portion. In a particular example embodiment the second retainer comprises a nut which threadedly engages the third adapter portion.

By way of example the bracket comprises a plurality of sidewalls attached to one another in spaced relation to define a U-shaped opening. IN a particular example the locking unit comprises a wire bale pivotably attached to the bracket. In another example the locking unit comprises a finger pivotably attached to the bracket.

BRIEF DESCRIPTION OF THE DRAWINGS

FIG. 8 is an isometric view of a portion of an example embodiment of an assembly according to the invention;

FIG. 9 is an isometric view of a portion of an example embodiment of an assembly according to the invention;

FIG. 10 is a partial sectional view of the embodiment shown in FIG. 9;

FIG. 11 is an isometric view of a portion of an embodiment of an assembly according to the invention; and FIG. 12 is a partial sectional view of the embodiment shown in FIG. 11.

DETAILED DESCRIPTION

Figure 1:
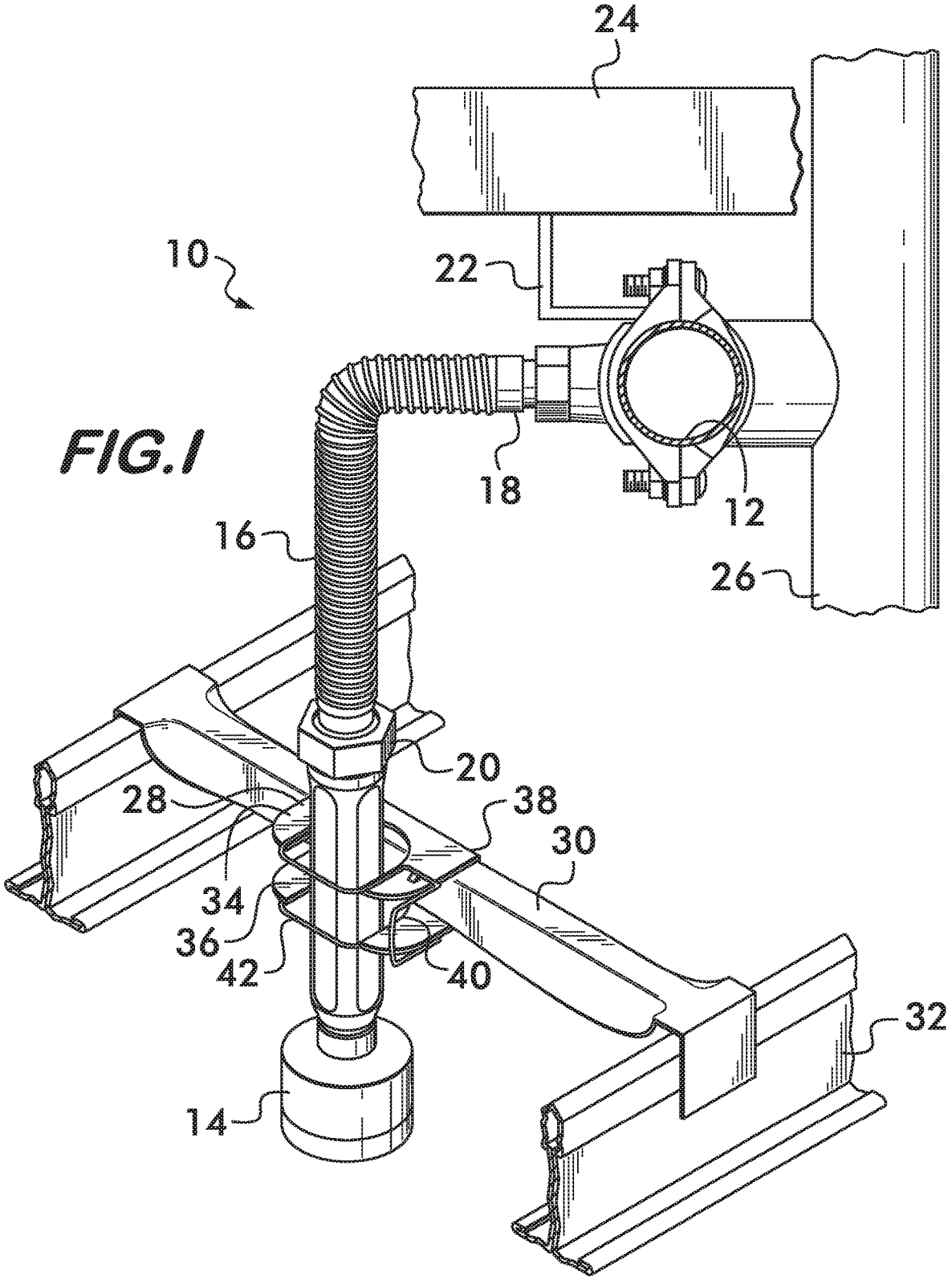
FIG. 1 is an isometric/partial sectional view of an example embodiment of an assembly for connecting a sprinkler to a branch line of a fire suppression system according to the invention.
Figure 1A:
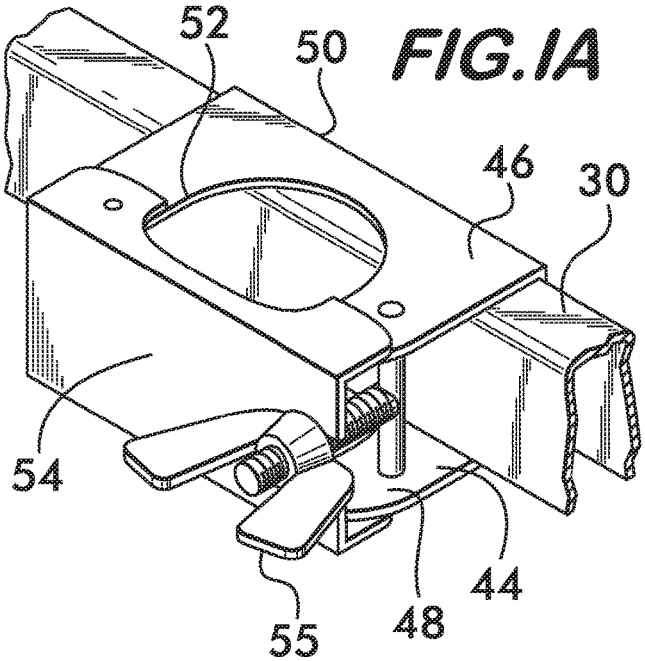
FIG. 1A is a partial view of an alternate embodiment of the assembly shown in FIG. 1.

FIG. 1 shows an assembly 10 for connecting a branch line 12 of a fire suppression system to a sprinkler 14. Note that sprinkler is defined herein as any device which discharges a fire suppression fluid, and includes, but is not limited to, items such as sprinklers, heads, nozzles, emitters and the like, whether they be open or closed and open in response to a fire. Assembly 10 comprises a flexible conduit 16 which has a first end 18 connected to the branch line 12, and a second end 20 which is connected to the sprinkler 14. The branch line 12 is supported by a pipe hanger 22 attached to a portion of the structure in which the fire suppression system is mounted, in this example, to the structural ceiling 24 of a building. Branch line 12 is one of many branch lines connected to a riser pipe 26 in fluid communication with a pressurized source of a fire suppressing fluid, such as water (not shown). A portion of the assembly 10 near the second end 20 of the flexible conduit 16 is engaged by a bracket 28 that is mounted on a cross beam 30 which extends between and is mounted on support rails 32 which support a decorative ceiling, such as a suspended ceiling or a drop ceiling (not shown) intended to hide the structural ceiling 24. Bracket 28 has various embodiments; the embodiment shown in FIG. 1 is disclosed in U.S. Pat. No. 7,784,746, hereby incorporated by reference herein. Bracket 28 includes sidewalls 34 and 36 connected to a back wall 38 in spaced relation to one another so as to receive cross beam 30. Bracket 28 also has a u-shaped opening 40 which receives the portion of the assembly 10. A locking unit, in this example, a wire bail 42 is pivotably attached to the sidewalls 34 and 36 and cooperates with them to affix the assembly to the cross beam 30. FIG. 1A illustrates another example bracket 44 which is disclosed in U.S. Pat. No. 7,735,787 and hereby incorporated by reference herein. Bracket 44 comprises sidewalls 46 and 48 each attached to a back wall 50 in spaced relation to one another so as to receive cross beam 30. Bracket 44 also has a u-shaped opening 52 which receives the portion of the assembly 10. A locking unit, in this example, a finger 54 is pivotably attached at one end to the sidewalls 46 and 48. The opposite end is secured to the sidewalls 46 and 48 by a pivoting wing nut assembly 55 to affix the assembly to the cross beam 30.

Figure 2:
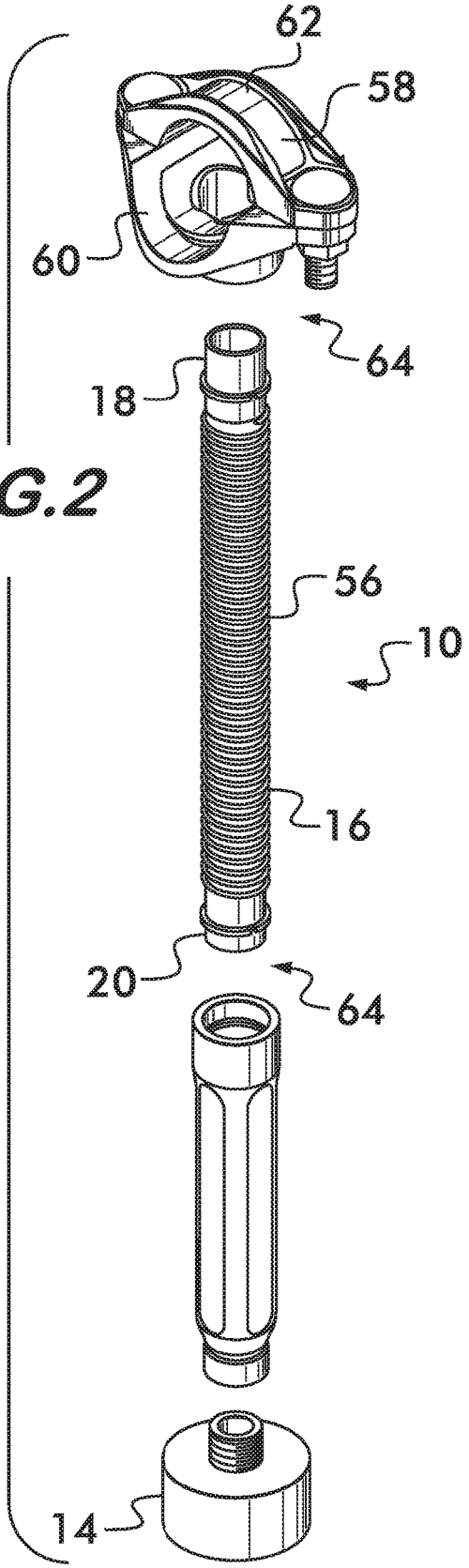
FIG. 2 is an exploded view of an example embodiment of an assembly according to the invention.

FIG. 2 illustrates in detail an example embodiment of the assembly 10, wherein the flexible conduit 16 comprises a corrugated stainless steel hose 56 which provides a flexible yet robust fluid tight member which resists corrosion. At the first end 18 of the assembly 10, the conduit 16 (hose 56) is connected to a saddle fitting 58. The saddle fitting comprises a saddle 60 which sealingly engages one side of the branch line 12 through an opening therein and is attached to the branch line by a strap 62 which wraps around the opposite side of the branch line 12 and is bolted to the saddle 60. Although various means, such as direct welding using an adapter, or using a threaded "tee" fitting, for connecting conduit 16 to the branch line 12 are also feasible, use of the saddle fitting 58 provides an advantage over these other connection means because the saddle fitting can be installed anywhere along the length of the branch line 12 merely by drilling the appropriate size opening in the branch line at a desired location, engaging the saddle 60 with the opening, and bolting the strap 62 to the saddle 60. The saddle fitting 58 thus eliminates welding as well as the need to determine the exact position of the connection point in a design, and allows the installer to position the connection where it is best suited relative to the desired position of the sprinkler 14 and the length of the conduit 16. This feature saves time in both the design phase of a project as well as during installation, as the designer need not calculate and specify the exact location of a large number of tee fittings in a system, and obvious errors in design can be avoided during installation since the installer is not constrained to make the connection where a tee fitting is located but is permitted greater freedom of action.

Figure 3:
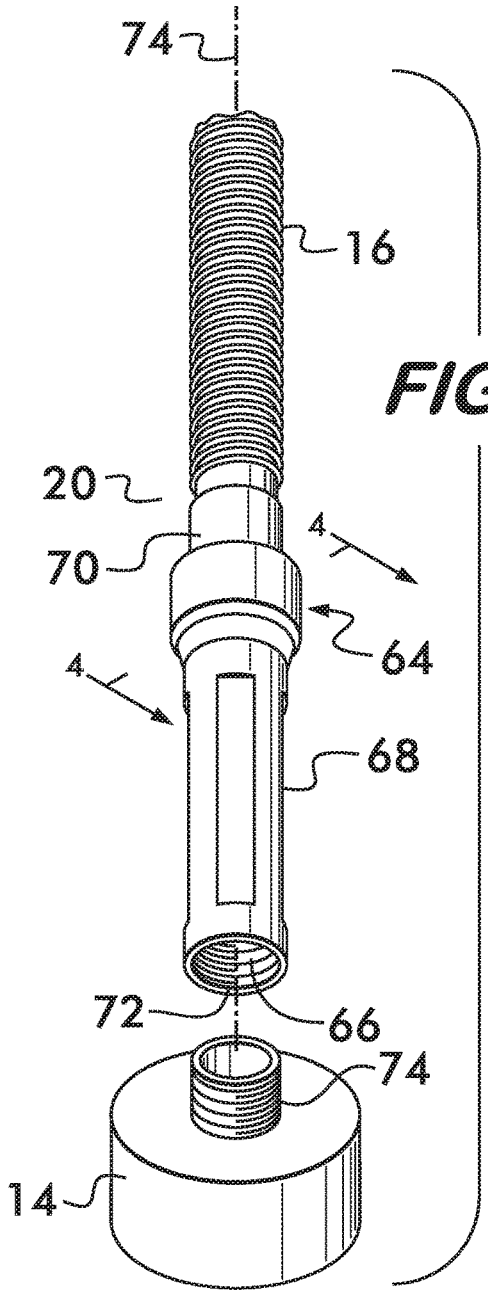
FIG. 3 is an exploded isometric view of a portion of the embodiment of the assembly shown in FIG. 2.

With reference again to the exploded view of FIG. 2, the connection of the conduit 16 to the sprinkler 14 (as well as to the branch line 12 via saddle fitting 58) may be effected by a rotatable adapter 64. As shown in detail in FIGS. 3 and 4, the example adapter 64 is positioned between the sprinkler 14 and the conduit 16. The adapter 64 has a longitudinal bore 66 and is formed of a first adapter portion 68 which is attachable to the sprinkler 14, and a second adapter portion 70 which is attached to the end 20 of conduit 16. In this example, attachment of the sprinkler 14 to the adapter portion 68 is effected using internal screw threads 72 (NPT threads, for example) at one end which receive compatible external screw threads 74 of the sprinkler 14. Other attachment means, such as brazing, welding, soldering and threadless connections such as bayonet mounts, are of course also feasible.

Adapter portions 68 and 70 are rotatable relatively to one another about a longitudinal axis 74 concentric with the bore 66. By allowing the adapter portions to rotate relatively to one another, application of torque to the conduit 16 about axis 74 is prevented, for example, when attaching the sprinkler 14 to the adapter, or when mounting the adapter onto a bracket or other support (see also FIG. 1), as well as torque caused by seismic activity or vibrations.

Figure 4:
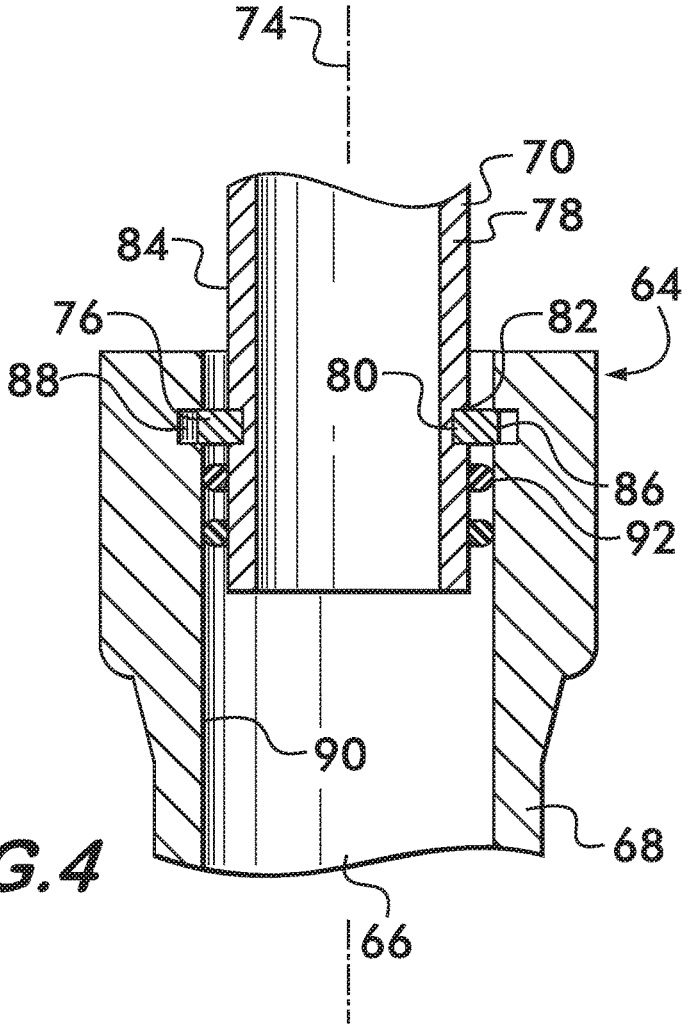
FIG. 4 is a partial sectional view taken at line 4-4 of FIG. 3.

As shown in detail in FIG. 4, relative rotation between the adapter portions 68 and 70 is permitted through the use of a split ring 76. Second adapter portion 70 comprises a tube 78 attached to the end 20 of the conduit 16. The bore 66 of the first adapter portion 68 is sized to receive the tube 78. The split ring 76, commercially known as a "snap ring", is used to prevent relative axial movement between the adapter portions and thereby join the conduit 16 to the sprinkler 14 while allowing relative rotation between those parts. Split ring 76 has an inner portion 80 sized to fit within an outwardly facing circumferential groove 82 positioned in the outer surface 84 of tube 78. Split ring 76 further has an outer portion 86 sized to fit within an inwardly facing circumferential groove 88 positioned on an inner surface 90 of the first adapter portion 68. Engagement between the split ring 76 and the circumferential grooves 82 and 88 does not inhibit relative rotation between the adapter portions 68 and 70, but prevents relative axial motion. The fact that the ring 76 is split allows it to be compressed or expanded into a smaller or larger diameter by forcing the free ends of the ring toward or away from one another as is well understood for split rings. This permits the ring portions to be disengaged from the circumferential grooves in the adapter portions and thereby allow assembly and disassembly of the adapter portions 68 and 70 as is well understood for split rings. One or more ring seals 92, for example elastomeric O-rings, are positioned between the outer surface 84 of tube 78 and the inner surface 90 of the adapter portion 68 for effecting the fluid tight connection between the adapter portions. As shown in FIG. 2, the example rotatable adapter 64 may be used between the conduit 16 and the sprinkler 14, and/or between the conduit 16 and the saddle fitting 58 (or other attachment means).

Figure 5:
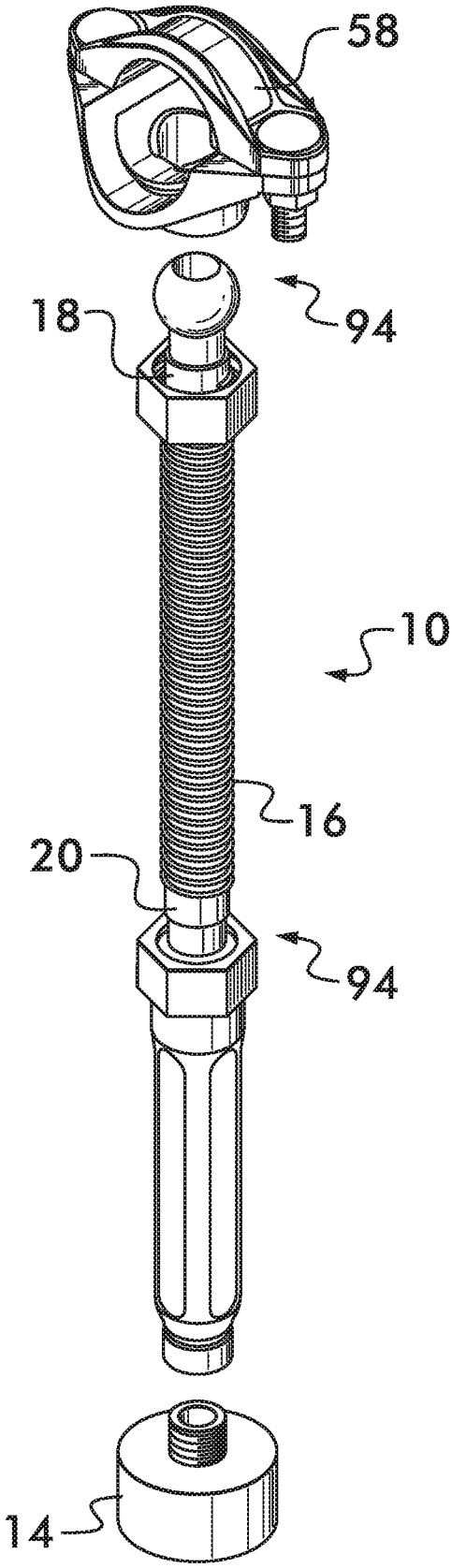
FIG. 5 is an exploded isometric view of a portion of an example embodiment of an assembly according to the invention.
Figure 6:
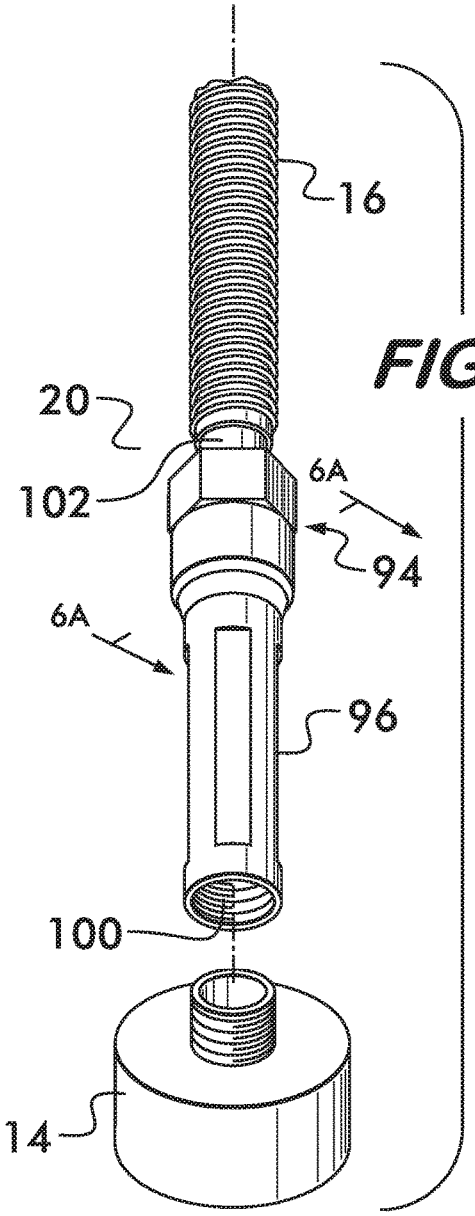
FIG. 6 is an exploded isometric view of a portion of the embodiment of the assembly shown in FIG. 5.
Figure 7:
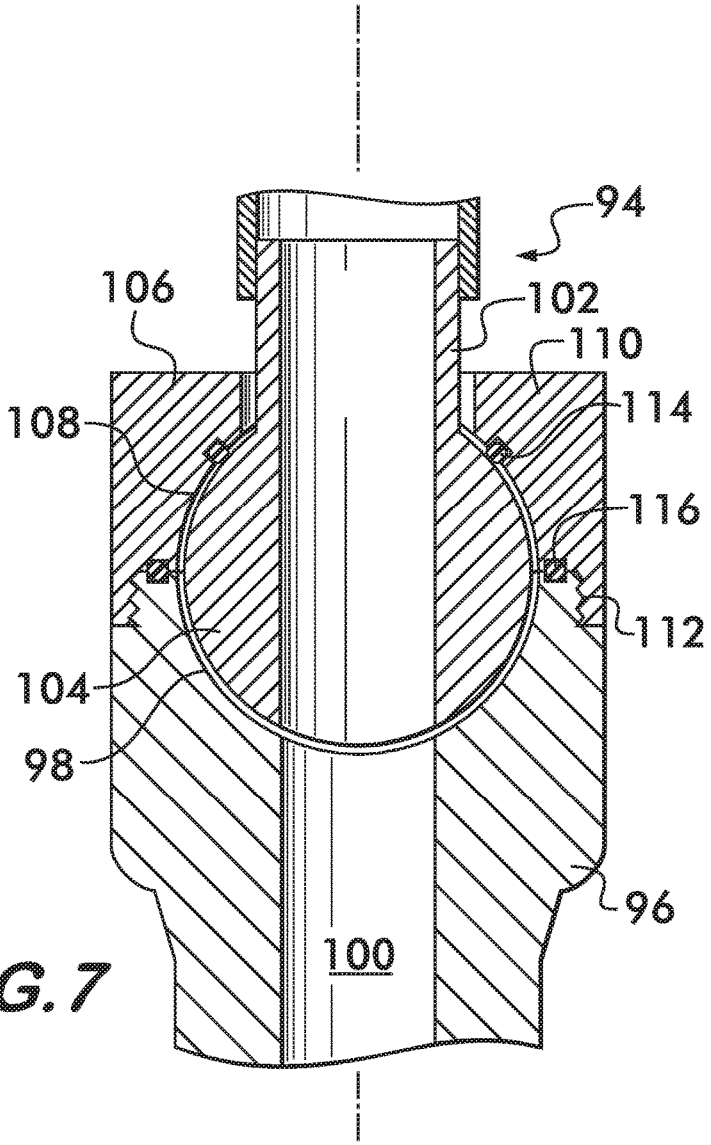
FIG. 7 is a partial sectional view taken at line 7-7 of FIG. 6.

FIGS. 5-7 illustrate another example of a rotatable adapter 94 which can be used to isolate conduit 16 from torsional forces imposed about any axis. As shown in FIG. 5, the adapter 94 may be positioned between a sprinkler 14 and the conduit 16 and/or between the conduit and the attachment means to the branch line (in this example a saddle fitting 58). As shown in detail in FIGS. 6 and 7 for the attachment of the sprinkler 14 to the conduit 16, the rotatable adapter 94 comprises a first adapter portion 96 having a concave spherical surface 98 positioned at one end and surrounding a bore 100. The sprinkler 14 may be mounted on the opposite end of the first adapter portion 96. A second adapter portion 102 has, at one end, a convex spherical surface 104 surrounding bore 100. The opposite end of the adapter portion 102 is attached to the conduit 16. The convex spherical surface 104 is sized to fit within the concave spherical surface 98 of adapter portion 96, thereby creating a ball joint which allows relative rotation between the adapter portions about any three mutually perpendicular axes, thus isolating the conduit 16 from any torsional force imposed by relative motion between the sprinkler and the branch line, as well as from forces applied to the sprinkler or adapter portion 96, for example, when the sprinkler is installed or the assembly is mounted on a support. The adapter portions 96 and 102 are held together by a retainer 106. Retainer 106 has a concave spherical surface 108 which surrounds the convex spherical surface 104 of the second adapter portion 102. The retainer is attached to the first adapter portion 96. In the example shown in FIG. 7 the retainer comprises a nut 110 which engages the first adapter portion 96 using screw threads 112. Other attachment means are also feasible. To ensure fluid tightness of the adapter 94 a seal 114 may be positioned between the second adapter portion 102 and the retainer 106 and another seal 116 may be positioned between the retainer 106 and the first adapter portion 96. The seals may be elastomeric rings, such as O-rings.

FIG. 8 shows another example assembly embodiment which comprises a sleeve 115 that co-axially surrounds a portion of the flexible conduit 16 proximate to an adapter 117. Adapter 117 is joined to the conduit 16 in this example by a union fitting 118 positioned at one end of the adapter and receives the external threads of the sprinkler (not shown) with internal threads 120 at the other end to effect attachment. Sleeve 115 may be made of a durable material, such as stainless steel, and may have a plurality of outwardly facing flat surfaces 122 allowing it to be easily captured by a mounting bracket, such as bracket 28 shown in FIG. 1. In the example sleeve shown in FIG. 8 there are six flat surfaces 122 which form a hexagonal sleeve cross section.

In the embodiment shown in FIG. 8, the sleeve 115 is formed of a split unitary body 124 having a first longitudinally extending edge 126 in facing relation with a second longitudinally extending edge 128. The edges 126 and 128 may be in spaced relation to one another so as to define a gap 130. This configuration allows the sleeve 115 to act as a collet with the ability to expand contract radially. In this embodiment the sleeve 115 is free to rotate about the conduit 16 but axial motion is prevented by a pair of fixed radially projecting shoulders 132 and 134. Shoulder 132 is mounted on the conduit 16 positioned between the sleeve 115 and the adapter 117 and shoulder 134 is positioned at the opposite end of the sleeve from shoulder 132. The shoulders 132 and 134 project radially outwardly from the conduit 16 and capture the sleeve 115 between them by engaging the ends of the sleeve.

FIGS. 9 and 10 illustrate another assembly embodiment having a sleeve 136 mounted on a flexible conduit 16 with a corrugated outer surface 138. The corrugated outer surface is comprised of a plurality of crests 140 and troughs 142 which extend helically around and define a central space 144. As shown in FIG. 10, sleeve 136 has a corrugated inwardly facing surface 146 comprising a plurality of crests 148 and troughs 150 which extend helically and are sized and spaced so as to fit within the crests 140 and troughs 142 of the corrugated outer surface 138 of the flexible conduit 16. Engagement between the crests and troughs of the sleeve 136 and the conduit 16 prevents axial sliding motion of the sleeve relatively to the conduit, but screw action upon rotation of the sleeve 136 relative to the conduit 16 allows the sleeve to be positioned as required along the conduit so that the sprinkler (not shown) is at the proper location relative to the decorative ceiling when the sleeve 136 is received by a support such as bracket 28 (see FIG. 1). The threaded engagement between the sleeve 136 and the corrugated surface 138 of conduit 16 allows limited rotation of the conduit relative to the sleeve (thereby preventing torque from being applied to the conduit 16) without significant axial motion of the conduit relative to the sleeve. In the example embodiment of FIG. 9, an adapter 152 is connected to the conduit 16 by a union fitting 154, the adapter having internal threads 156 to receive the external threads of a sprinkler.

In another assembly embodiment, shown in FIGS. 11 and 12, the crests and troughs 140 and 142 forming the corrugated surface 138 of the conduit 16 are not helically arranged, but extend circumferentially around and define the central space 144. In this embodiment a sleeve 158 also has a plurality of crests 160 and troughs 162 which extend circumferentially around the sleeve inner surface 164. The crests 160 and troughs 162 of the sleeve 158 are sized and spaced to engage the crests 140 and troughs 142 of the conduit 16 and thus prevent sliding axial motion of the sleeve 158 relatively to the conduit 16 while permitting relative rotational motion between the two parts. In this embodiment, the sleeve 158 is split, as evidenced by the gap 166 (see FIG. 11). This allows the sleeve 158 to be positioned axially along the conduit by elastically deforming the sleeve outwardly to disengage its crests and troughs from the troughs and crests of the conduit 16, moving the sleeve along the conduit to the desired position, and then releasing the sleeve, allowing it to return to its undeformed shape engaging the crests and troughs by virtue of its resilient characteristics.

The embodiments provided herein show union joints by way of example, it being understood that other types of connections, such as fixed NPT sprinkler outlets, swivel sprinkler outlets as well as NPT adapters are also feasible for use with the assembly according to the invention.

The assembly for connecting a sprinkler to a branch line of a fire suppression system according to the invention will provide numerous advantages over the prior art. The assembly is easy to install on a branch line and provides great adjustability of the final position of the sprinkler, thereby simplifying design and installation tasks. It is much more difficult to over-torque the assembly due to the rotational freedom afforded by the rotatable adapter or the sleeve, resulting in a significantly decreased potential for damage upon installation or during a seismic event. Additionally, the assembly can be pressure loss tested as a unit (with or without the sprinkler installed) thereby providing the system designer one equivalent length number indicative of head loss instead of resorting to calculating the equivalent length as the sum of equivalent lengths for each component of the assembly. This should improve the accuracy of hydraulic calculations. Furthermore, the entire assembly, including the sprinkler head, may be K-factor tested which will provide a single, simplified K-factor number of increased accuracy, the K-factor being a constant of proportionality used to determine the flow rate of a nozzle as a function of the square root of the pressure at the nozzle.

While the example assembly embodiments disclosed herein are described in the context of a fire suppression system, it is understood that the descriptions are examples and that the assembly embodiments disclosed herein may also be used with other systems, such as hydronic systems, where a fluid is conveyed by a flexible conduit which it is desired to isolate from unwanted and potentially damaging applied torques.

What is claimed is:

1. An assembly for connecting a sprinkler to a branch line of a fire suppression system, said assembly comprising:

a flexible conduit having a first end connectable to said branch line, and a second end connectable to said sprinkler, said conduit providing fluid communication between said branch line and said sprinkler;

a first adapter positioned between said sprinkler and said second end of said conduit for effecting attachment of said sprinkler to said conduit, said first adapter having a bore providing fluid communication between said sprinkler and said conduit, said first adapter having a first adapter portion attachable to said sprinkler and a second adapter portion attached to said second end of said conduit, said first and second adapter portions being rotatable relatively to one another;

a bracket having an opening receiving said first adapter portion and a locking unit movably mounted on said bracket, said locking unit engaging and retaining said first adapter portion within said opening;

a cross beam received by said bracket for securing said bracket in relation to said branch line; and said second adapter portion comprises a tube attached to said second end of said conduit, said tube being received within said bore of said adapter in said first adapter portion;

a ring seal is positioned between an outer surface of said tube and an inner surface of said bore in said first adapter portion for effecting a fluid-tight connection between said first and second adapter portions;

a split ring is positioned between said outer surface of said tube and said inner surface of said bore in said first adapter portion, said split ring having an inner portion sized to fit within an outwardly facing circumferential groove positioned in said outer surface of said tube, said split ring further having an outer portion sized to fit within an inwardly facing circumferential groove positioned in said inner surface of said bore in said first adapter portion, said split ring preventing relative axial movement between said first and second adapter portions but permitting relative rotation between said first and second adapter portions about a longitudinal axis concentric with said bore.

2. The assembly according to claim 1, wherein:

said first adapter portion comprises a concave spherical surface positioned at an end thereof and surrounding said bore;

said second adapter portion comprises a convex spherical surface surrounding said bore and positioned at one end thereof, an opposite end of said second adapter portion being attached to said second end of said conduit, said convex spherical surface fitting within said concave spherical surface thereby permitting said first and second adapter portions to rotate relatively to one another;

a retainer having a concave spherical surface, said retainer surrounding said convex spherical surface of said second adapter portion and being attached to said first adapter portion, said second adapter portion being captured between said retainer and said first adapter portion.

3. The assembly according to claim 2, further comprising a first seal positioned between said second adapter portion and said retainer, and a second seal positioned between said retainer and said first adapter portion.

4. The assembly according to claim 2, wherein said retainer comprises a nut which threadedly engages said first adapter portion.

5. The assembly according to claim 1, further comprising said sprinkler.

6. The assembly according to claim 1, further comprising:

a second adapter positioned between said branch line and said first end of said conduit for effecting attachment of said conduit to said branch line, said second adapter having a second bore providing fluid communication between said branch line and said conduit, said second adapter having a third adapter portion attachable to said branch line and a fourth adapter portion attached to said first end of said conduit, said third and fourth adapter portions being rotatable relatively to one another.

7. The assembly according to claim 6, wherein:

said fourth adapter portion comprises a second tube attached to said first end of said conduit, said second tube being received within said bore of said second adapter in said third adapter portion;

a ring seal is positioned between an outer surface of said second tube and an inner surface of said bore in said third adapter portion for effecting a fluid-tight connection between said third and fourth adapter portions;

a split ring is positioned between said outer surface of said second tube and said inner surface of said bore in said third adapter portion, said split ring having an inner portion sized to fit within an outwardly facing circumferential groove positioned in said outer surface of said second tube, said split ring further having an outer portion sized to fit within an inwardly facing circumferential groove positioned in said inner surface of said bore in said third adapter portion, said split ring preventing relative axial movement between said third and fourth adapter portions but permitting relative rotation between said third and fourth adapter portions about a longitudinal axis concentric with said second bore.

8. The assembly according to claim 6, wherein:

said third adapter portion comprises a concave spherical surface positioned at an end thereof and surrounding said bore in said third adapter portion;

said fourth adapter portion comprises a convex spherical surface surrounding said bore in said fourth adapter portion and positioned at one end thereof, an opposite end of said fourth adapter portion being attached to said first end of said conduit, said convex spherical surface of said fourth adapter portion fitting within said concave spherical surface of said third adapter portion thereby permitting said third and fourth adapter portions to rotate relatively to one another;

a second retainer having a concave spherical surface, said second retainer surrounding said convex spherical surface of said fourth adapter portion and being attached to said third adapter portion, said fourth adapter portion being captured between said second retainer and said third adapter portion.

9. The assembly according to claim 8, further comprising a third seal positioned between said second retainer and said fourth adapter portion and a fourth seal positioned between said second retainer and said third adapter portion.

10. The assembly according to claim 8, wherein said second retainer comprises a nut which threadedly engages said third adapter portion.

11. The assembly according to claim 1, wherein said bracket comprises a plurality of sidewalls attached to one another in spaced relation to define a U-shaped opening.

12. The assembly according to claim 11, wherein said locking unit comprises a wire bale pivotably attached to said bracket.

13. The assembly according to claim 11, wherein said locking unit comprises a finger pivotably attached to said bracket.

14. An assembly for connecting a sprinkler to a branch line of a fire suppression system, said assembly comprising:

a flexible conduit having a first end connectable to said branch line, and a second end connectable to said sprinkler, said conduit providing fluid communication between said branch line and said sprinkler;

a first adapter having a first adapter portion attachable to said branch line and a second adapter portion attached to said first end of said conduit, said first and second adapter portions being rotatable relatively to one another, said first adapter having a bore providing fluid communication between said branch line and said conduit;

a second adapter positioned between said sprinkler and said second end of said conduit for effecting attachment of said conduit to said sprinkler, said second adapter having a bore providing fluid communication between said sprinkler and said conduit;

a bracket having an opening receiving said second adapter and a locking unit movably mounted on said bracket, said locking unit engaging and retaining said second adapter within said opening;

a cross beam received by said bracket for securing said bracket in relation to said branch line; and said second adapter portion comprises a tube attached to said first end of said conduit, said tube being received within said bore of said first adapter in said first adapter portion;

a ring seal is positioned between an outer surface of said tube and an inner surface of said bore in said first adapter portion for effecting a fluid-tight connection between said first and second adapter portions;

a split ring is positioned between said outer surface of said tube and said inner surface of said bore in said first adapter portion, said split ring having an inner portion sized to fit within an outwardly facing circumferential groove positioned in said outer surface of said tube, said split ring further having an outer portion sized to fit within an inwardly facing circumferential groove positioned in said inner surface of said bore in said first adapter portion, said split ring preventing relative axial movement between said first and second adapter portions but permitting relative rotation between said first and second adapter portions about a longitudinal axis concentric with said bore of said first adapter.

15. The assembly according to claim 14, further comprising said sprinkler.

16. The assembly according to claim 14, wherein:

said first adapter portion comprises a concave spherical surface positioned at an end thereof and surrounding said bore of said first adapter in said first adapter portion;

said second adapter portion comprises a convex spherical surface surrounding said bore in said first adapter portion and positioned at one end thereof, an opposite end of said second adapter portion being attached to said first end of said conduit, said convex spherical surface fitting within said concave spherical surface thereby permitting said first and second adapter portions to rotate relatively to one another;

a retainer having a concave spherical surface, said retainer surrounding said convex spherical surface of said second adapter portion and being attached to said first adapter portion, said second adapter portion being captured between said retainer and said first adapter portion.

17. The assembly according to claim 16, further comprising a first seal positioned between said second adapter portion and said retainer, and a second seal positioned between said retainer and said first adapter portion.

18. The assembly according to claim 16, wherein said retainer comprises a nut which threadedly engages said first adapter portion.

19. The assembly according to claim 14, wherein said second adapter has a third adapter portion attachable to said sprinkler and a fourth adapter portion attached to said second end of said conduit, said third and fourth adapter portions being rotatable relatively to one another, said third adapter portion being received within said bracket.

20. The assembly according to claim 19, wherein:

said fourth adapter portion comprises a second tube attached to said second end of said conduit, said second tube being received within said bore of said second adapter in said third adapter portion;

a ring seal is positioned between an outer surface of said second tube and an inner surface of said bore in said third adapter portion for effecting a fluid-tight connection between said third and fourth adapter portions;

a split ring is positioned between said outer surface of said second tube and said inner surface of said bore of said third adapter portion, said split ring having an inner portion sized to fit within an outwardly facing circumferential groove positioned in said outer surface of said second tube, said split ring further having an outer portion sized to fit within an inwardly facing circumferential groove positioned in said inner surface of said bore in said third adapter portion, said split ring preventing relative axial movement between said third and fourth adapter portions but permitting relative rotation between said third and fourth adapter portions about a longitudinal axis concentric with said bore of said second adapter.

21. The assembly according to claim 14, wherein:

said third adapter portion comprises a concave spherical surface positioned at an end thereof and surrounding said bore in said third adapter portion;

said fourth adapter portion comprises a convex spherical surface surrounding said bore in said fourth adapter portion and positioned at one end thereof, an opposite end of said fourth adapter portion being attached to said second end of said conduit, said convex spherical surface of said fourth adapter portion fitting within said concave spherical surface of said third adapter portion thereby permitting said third and fourth adapter portions to rotate relatively to one another;

a second retainer having a concave spherical surface, said second retainer surrounding said convex spherical surface of said fourth adapter portion and being attached to said third adapter portion, said fourth adapter portion being captured between said second retainer and said third adapter portion.

22. The assembly according to claim 21, further comprising a third seal positioned between said second retainer and said fourth adapter portion and a fourth seal positioned between said second retainer and said third adapter portion.

23. The assembly according to claim 21, wherein said second retainer comprises a nut which threadedly engages said third adapter portion.

24. The assembly according to claim 14, wherein said bracket comprises a plurality of sidewalls attached to one another in spaced relation to define a U-shaped opening.

25. The assembly according to claim 14, wherein said locking unit comprises a wire bale pivotably attached to said bracket.

26. The assembly according to claim 14, wherein said locking unit comprises a finger pivotably attached to said bracket.

[27. A sprinkler assembly attachable to a pressurized source of a fire suppressing fluid, said sprinkler assembly comprising:

a sprinkler for discharging said fire suppressing fluid; p1 a flexible conduit having a first end attachable to said source of fire suppressing liquid and a second end connected to said sprinkler; wherein said fire suppressing liquid is discharged from said discharge opening at a flow rate defined by a simpli-fied K-factor number which includes pressure losses from said flexible conduit and said sprinkler head, said simplified K-factor number defined as a ratio of said flow rate divided by a square root of a fluid pressure at said discharge opening.]

[28. The sprinkler assembly according to claim 27, further comprising an adapter positioned between said sprinkler and said second end of said conduit and connecting said sprinkler thereto, said adapter having a lore providing fluid communication between said sprinkler and said conduit.]

[29. The sprinkler assembly according to claim 27, wherein said flexible conduit comprises a corrugated hose.]

*30. The assembly according to claim 26, wherein said locking unit further comprises a pivoting wingnut assembly positioned at an end of said finger to affix set assembly to said cross beam.*

* * * * *